Patented Nov. 17, 1925.

1,562,360

UNITED STATES PATENT OFFICE.

ANTON JENSÉNIUS ANDREAS OTTESÉN, OF COPENHAGEN, DENMARK.

DIRECT COOLING OF GOODS.

No Drawing.   Application filed March 1, 1924.  Serial No. 696,398.

*To all whom it may concern:*

Be it known that I, ANTON JENSÉNIUS ANDREAS OTTESÉN, a subject of the King of Denmark, residing at 14 Dosseringen, Copenhagen, Denmark, have invented certain new and useful Improvements in or Relating to Direct Cooling of Goods, of which the following is a specification.

My present invention relates to the refrigerating or freezing of goods through direct treatment with a cooled solution of inorganic salts or both inorganic and organic matters.

According to my experiences substances dissolved in the cooled solution remaining on the surface of the cooled goods highly injure the appearance and quality of the stored and afterwards melted goods. Through the action of the substances dissolved in the refrigerating medium, foreign to the goods, the superficial and deeper lying layers of the goods are disturbed. When the goods present sectional surfaces, as in the case of big fish, beef, pork or the like, the surfaces are discoloured through the action of the foreign matters.

The object of my present invention is to remove these drawbacks by effectively flushing the frozen surfaces of the goods, so as to dissolve and remove the substances dissolved in the refrigerating solution, which after the freezing remain in the very many cavities, visible or microscopic, of the surfaces of the goods.

My invention consists in a process for the preservation of goods by refrigeration in which the goods are exposed to the direct action of a cooled solution of salts or other compounds whereby a temperature below freezing point is obtained, and removing the substances contained in the solution which are retained on the surfaces of the cooled goods, by exposing the goods to the action of a solvent in a tepid or hot state.

The expression "hot state" I wish to have understood as relative, i. e. relative to the temperature of the refrigerating solution. The temperature of the solvent must be high enough to permit the solvent when touching the very cold surfaces of the goods to remain liquid itself and to somewhat melt or liquefy the surfaces so as to completely dissolve and extract the substances dissolved in the refrigerating solution in the superficial cavities of the goods.

As the solvent used in the refrigerating solution is generally water, I may for the present flushing or cleaning operation make use of tepid or hot water, but I do not confine myself to the use of water.

In the already known processes for direct cooling of goods according to my former patent 1,129,716 and my pending application 433,408 of 27th December 1920, it has been customary to dip the frozen goods in cold fresh water or ice water in order to get them coated with an ice layer so as to present a glazed appearance. Also according to the French Patent 506,296 the goods are firstly frozen in an isotonic bath and thereupon dipped into a fresh water bath in order to be wetted with fresh water which is frozen through the inner cold of the goods. According to the U. S. A. Patent 1,388,298 these processes have later been imitated. Obviously the already known after treatment with cold water in order to produce a coating with fresh ice does not constitute a cleaning or dissolving process in the sense of my present invention, according to which such hot wash water is applied that no subsequent glazing effect takes place. After my experiences the glazing of the goods is in some cases very unfortunate, especially when freezing meats.

When working and glacing according to the known processes the cold fresh water touching the surfaces of the very cold goods is immediately transformed into ice and thus the substances dissolved in the refrigerating solution are retained on the surface and in its many cavities and are not dissolved and removed but even fixed by the superposed ice layer formed by the after treatment with cold water.

On the other hand, when the refrigerated or frozen goods according to the present invention are treated with tepid or hot water, this will remain liquid on the surfaces of the goods and somewhat melt and liquefy the same hereby completely dissolving and extracting the substances dissolved in the refrigerating solution, i. e. its content of freezing point lowering substances which are foreign to the goods. Thus the goods, although they have been in direct contact for a long period with a strong solution of foreign matters, are brought back to the natural state, any after effect of the foreign matters other than the cold intended, being avoided.

The process employed by washing with hot water may be as follows. The goods viz quarters of oxen are frozen in any suitable known liquid bath at temperatures, which may be chosen between —10 and —25° centigrade. When frozen they are removed from the freezing bath and dipped into hot water at about 60° centigrade, where they are kept for a few seconds. The wash water possessing such a high temperature, cannot get essentially cooled as to get frozen and form an ice coating when coming into touch with the very cold meat surface. On the contrary it makes the frozen meat surface melt on a thickness between 1 and 2 mm. Thereby the salt particles sticking to the meat surface as well as those penetrating a little deeper are effectively washed away. A very short and really hot washing is more effective than a longer and only tepid one. The thawed or melted surface of the meat is getting frozen immediately after the end of the washing process on account of the excessive cold in the inside of the meat. The surface of such meat looks exactly as red and fresh as if it were frozen in the air; nor is it tender so as to get any pressure marks when stored.

Only an insignificant quantity of cold is lost during the washing and the thawing connected with it, as the meat as a rule gets frozen in brine baths of rather lower temperatures, e. g. —20° centigrade than those of which they later on are stored or e. g. —10° centigrade. Although a quantity of cold in the inner of the meat is spent for cooling the thawed surface, nevertheless the average temperature of the meat does not surpass the storage temperature. Thus the discoloring and softening effects of the quick freezing method are radically removed and a considerable technical progress is made.

The present invention causes a certain loss of cold, but this loss is insignificant compared with the advantages of guarding the natural quality of the goods against depreciation.

I claim:

A process for the preservation of goods by refrigeration, consisting in exposing the goods to the direct action of a cooled solution of salts or other compounds whereby a temperature below freezing point is obtained, and removing the substances contained in the solution which are retained on the surfaces of the cooled goods, by exposing the goods to the action of a solvent in a tepid or hot state.

In testimony whereof I hereunto affix my signature.

ANTON JENSÉNIUS ANDREAS OTTESÉN.